United States Patent [19]

Wilson et al.

[11] Patent Number: 5,363,938
[45] Date of Patent: * Nov. 15, 1994

[54] POWER TRANSFER SYSTEM FOR A FOUR-WHEEL DRIVE VEHICLE

[75] Inventors: Robert J. Wilson, Warners; David Sperduti, Auburn; Richard E. Eastman, Central Square; Randy W. Adler, Seneca Falls; Joseph A. Winks, West Monroe, all of N.Y.

[73] Assignee: New Venture Gear, Inc., Troy, Mich.

[ * ] Notice: The portion of the term of this patent subsequent to Jul. 19, 2011 has been disclaimed.

[21] Appl. No.: 28,299

[22] Filed: Mar. 9, 1993

[51] Int. Cl.5 ............................................. B60K 17/34
[52] U.S. Cl. ................................... 180/233; 180/247; 180/249
[58] Field of Search ............... 180/233, 247, 248, 249, 180/250, 197

[56] References Cited

U.S. PATENT DOCUMENTS

| 4,417,641 | 11/1983 | Kageyama | 180/247 |
|---|---|---|---|
| 4,484,653 | 11/1984 | Horikoshi et al. | 180/233 |
| 4,711,317 | 12/1987 | Sakakiyama | 180/197 |
| 4,757,870 | 7/1988 | Torii et al. | 180/233 |
| 4,773,500 | 9/1988 | Naito et al. | 180/233 |
| 4,776,424 | 10/1988 | Naito | 180/233 |
| 4,846,298 | 7/1989 | Naito | 180/233 |
| 4,887,689 | 12/1989 | Naito | 180/233 |
| 4,989,686 | 2/1991 | Miller et al. | 180/197 |
| 5,033,575 | 7/1991 | Takeshita et al. | 180/249 |
| 5,046,576 | 9/1991 | Miyawaki | 180/233 |
| 5,046,998 | 9/1991 | Frost | 180/247 X |
| 5,078,660 | 1/1992 | Williams et al. | 180/250 X |
| 5,152,362 | 10/1992 | Naito | 180/248 |
| 5,199,325 | 4/1993 | Reuter et al. | 180/248 X |

Primary Examiner—Mitchell J. Hill
Assistant Examiner—Victor E. Johnson
Attorney, Agent, or Firm—Harness, Dickey & Pierce

[57] ABSTRACT

The present invention provides a power transfer system for a four-wheel drive vehicle which permits the vehicle operator to choose between operation in two-wheel drive and part-time four-wheel drive modes or an "on-demand" four-wheel drive mode. The power transfer system is operable for disabling the on-demand four-wheel drive feature upon the vehicle operator subsequently shifting into any of the two-wheel drive and part-time four-wheel drive modes.

23 Claims, 8 Drawing Sheets

POWER TRANSFER SYSTEM FOR A FOUR-WHEEL DRIVE VEHICLE

BACKGROUND OF THE INVENTION

The present invention relates to a power transfer system for controlling the distribution of drive torque between the front and rear wheels of a four-wheel drive vehicle as a function of various system and operator-initiated inputs.

In view of increased consumer popularity in four-wheel drive vehicles, a plethora of power transfer systems are currently being utilized in vehicular driveline applications for selectively directing tractive power (i.e., drive torque) to the non-driven wheels of the vehicle. In many power transfer systems, a part-time transfer case is incorporated into the driveline and is normally operable in a two-wheel drive mode for delivering drive torque to the driven wheels. However, the vast majority of such part-time transfer cases include a mechanical "mode" shift mechanism which can be selectively actuated by the vehicle operator for rigidly coupling the non-driven wheels to the driven wheels for establishing a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. In one typical application, a viscous transmission device, such as a viscous coupling, is located in the driveline between the driven and non-driven wheels to provide "on-demand" four-wheel drive operation. Modernly, it is known to incorporate the "on-demand" feature into a transfer case by replacing the mechanical mode shift mechanism with a multi-disc clutch assembly that is interactively associated with an electronic control system and a sensor arrangement. During normal road conditions, the clutch assembly is maintained in a non-actuated state such that drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in U.S. Pat. No. 4,773,500 to Naito, et al wherein a hydraulically-actuated clutch assembly is operable for automatically controlling the amount of drive torque transferred to the non-driven wheels as a function the wheel speed difference (i.e., the wheel slip) between the front and rear wheels.

While numerous variations of such hydraulically-actuated "on-demand" power transfer systems are known, they are primarily intended for road use in passenger cars and not for off-road recreational or sport/utility vehicles. In addition, such conventional "on-demand" transfer cases are single-mode power transfer mechanisms which do not provide means for permitting the vehicle operator to deliberately shift between traditional two-wheel drive and part-time four-wheel drive modes of operation. Thus, the need exists to develop a transfer case incorporating an "on-demand" four-wheel drive feature which can be effectively over-ridden upon the vehicle operator selectively shifting the transfer case into either of a two-wheel drive mode or a part-time four-wheel drive mode.

SUMMARY OF THE INVENTION

Accordingly, it is an object of the present invention to overcome the disadvantages associated with conventional four-wheel drive systems by providing a power transfer system having an "on-demand" four-wheel drive feature incorporated into a transfer case that can be intentionally "over-ridden" upon the vehicle operator selectively shifting into a two-wheel drive mode or a part-time four-wheel drive mode. Thus, the present invention offers the vehicle operator the option of selecting the specific drive mode best-suited for operating the motor vehicle during normal or adverse road conditions as well as for off-road recreational use.

Pursuant to a related object of the present invention, the power transfer system is operably installed between the driven and non-driven wheels of a motor vehicle and is adapted to establish at least three distinct operative drive modes. In a preferred form, the power transfer system includes a transfer case equipped with a clutch assembly for selectively transferring drive torque to the non-driven wheels, actuator means for actuating the clutch assembly, sensor means for detecting various dynamic and operational characteristics of the vehicle and generating sensor input signals indicative thereof, mode select means for permitting the vehicle operator to select one of the distinct operative drive modes and generating a mode signal indicative thereof, and controller means for controlling actuation of the actuator means in response to the sensor input signals and the mode signal. The mode select means permits the vehicle operator to shift the transfer case into one of a two-wheel drive mode, a part-time four-wheel drive mode, and an "on-demand" mode. When the two-wheel drive mode is selected, the clutch assembly is de-actuated such that all drive torque is delivered to the driven wheels. When the part-time four-wheel drive mode is selected, the clutch assembly is fully actuated into a "lock-up" condition for distributing the drive torque between the driven and non-driven wheels as dictated by the tractive force generated at each respective set of wheels. When the "on-demand" mode is selected, the actuated condition of the clutch assembly is controllably modulated as a function of the sensor input signals for automatically varying the amount of drive torque directed to the non-driven wheels. In a preferred form, the power transfer system automatically provides improved traction and steering control upon the occurrence of instantaneous and unanticipated traction loss at the driven wheels when operating in the "on-demand" mode.

A further object of the present invention is to supply one or more "operator-initiated" input signals to the controller means for further controlling "on-demand" operation of the power transfer system. Preferably, the operator-initiated input signals are indicative of the position of a movable control element (i.e., accelerator pedal, throttle position, steering wheel, brake pedal, etc.) and are used, in conjunction with the sensor input signals, for optimizing the amount of drive torque delivered to the non-driven wheels during operation in the "on-demand" mode.

According to a further defined embodiment, the transfer case is equipped with a speed reduction mechanism for establishing a direct-drive ("High") speed range and a reduced-ratio drive ("Low") speed range. In addition, the actuator means is operable for shifting the speed reduction mechanism between its various speed ranges in addition to controlling actuation of the clutch assembly. Thus, the vehicle operator is capable of selectively shifting the power transfer system between a two-wheel high-range drive mode (2 WH), a part-time four-wheel high-range drive mode (4 WH), a part-time four-wheel low-range drive mode (4 WL) and the "on-demand" mode.

BRIEF DESCRIPTION OF THE DRAWINGS

Further objects, features and advantages of the present invention will become apparent from analysis of the following written specification, the accompanying drawings and the appended claims in which:

DETAILED DESCRIPTION OF THE INVENTION

In general, the present invention is directed to a power transfer system which is operably installed between the driven and non-driven wheels of a four-wheel drive vehicle and which includes means for permitting a vehicle operator to select between a two-wheel drive mode, a part-time four-wheel drive mode, and an "on-demand" drive mode. When shifted into the "on-demand" drive mode, the amount of power (i.e., drive torque) delivered to the non-driven wheels is controllably regulated in accordance with various system and driver-initiated inputs for optimizing the tractive characteristics of the vehicle while concomitantly enhancing overall steering control.

Figure 1:
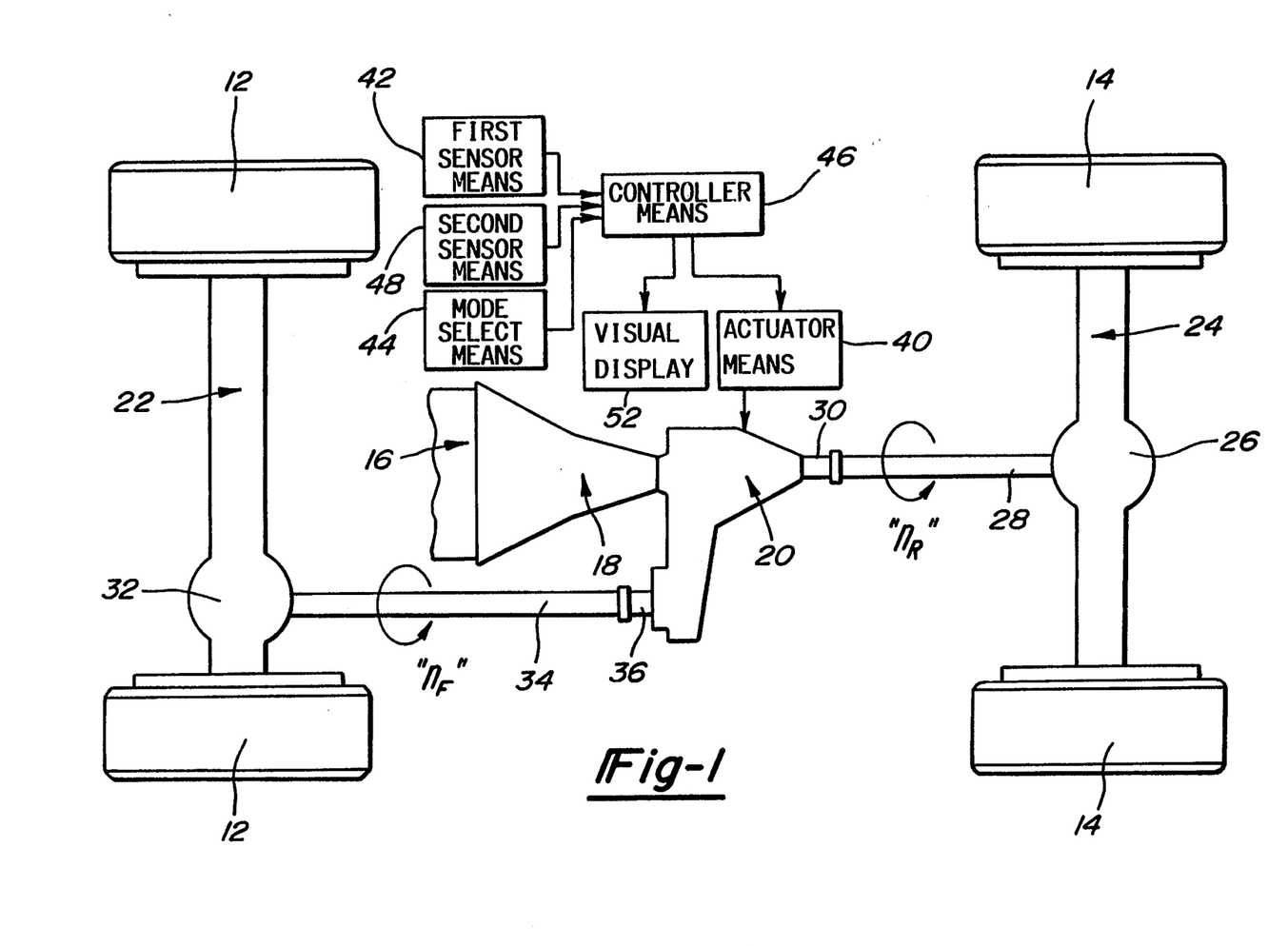
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10 which incorporates the novel principles of the present invention. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in the two-wheel drive mode of operation. However, it is to be understood that the specific orientation of the drivetrain is merely exemplary in nature and that the drivetrain could be reversed for normally driving front wheels 12 in the two-wheel drive mode.

Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output member 30 of transfer case 20. Similarly, front axle assembly 22 includes a front differential 32 that is coupled to one end of a front drive shaft 34, the opposite end of which is coupled to a second output member 36 of transfer case 20. As will be detailed hereinafter with greater specificity, transfer case 20 is equipped with an electronically-controlled torque transfer arrangement for transferring drive torque to front wheels 12 (i.e., the "non-driven" wheels) in addition to rear wheels 14 for establishing the part-time four-wheel drive mode and the "on-demand" drive mode.

According to a preferred embodiment of power transfer system 10, the torque transfer arrangement includes a transfer clutch 38 that is operable for selectively transferring drive torque from first output member 30 to second output member 36, thereby delivering drive torque to front wheels 12. Power transfer system 10 further comprises actuator means 40 for actuating transfer clutch 38, first sensor means 42 for sensing specific dynamic and operational characteristics of the motor vehicle and generating sensor input signals indicative thereof, mode select means 44 for permitting the vehicle operator to select one of the drive modes and generate a mode signal indicative thereof, and controller means 46 for generating a control signal in response to the sensor input signals and the mode signal. The controller means 46 is further operable for controlling the amount of drive torque transfer through transfer clutch 38 to second output member 36 by sending the control signal to actuator means 40. When the two-wheel drive mode is selected, all drive torque is delivered from first output member 30 to rear wheels 14 and transfer clutch 38 is maintained in a "non-actuated" condition. When the part-time four-wheel drive mode is selected, transfer clutch 38 is fully actuated into a "lock-up" condition such that second output member 36 is, in effect, rigidly coupled for driven rotation with first output member 30. Thus, in the part-time four-wheel drive mode, drive torque is distributed between front and rear wheels 12 and 14, respectively, as dictated by the tractive forces generated at each respective set of wheels. When the "on-demand" drive mode is selected, controller means 46 controls the degree of actuation of actuator means 40 for instantaneously varying the amount of drive torque directed to front wheels 12 through transfer clutch 38 as a function of the sensor input signals for providing enhanced tractive performance. In addition, the ability to controllably modulate the actuated condition of transfer clutch also provides for superior handling and steering control by substantially minimizing the oversteer and understeer tendencies of the vehicle during a cornering maneuver, such tendencies known to be commonly associated with two-wheel drive operation and part-time four-wheel drive operation, respectively. Other advantages associated with controllably modulating the actuated state of transfer clutch 38 will be detailed hereinafter.

Power transfer system 10 can additionally include second sensor means 48 for generating "operator-initiated" input signals that are indicative of the position of one or more movable control elements under the control of the vehicle operator. The operator-initiated input signals are used for establishing control characteristics which, in conjunction with the sensor input signals, further regulate the torque distribution during "on-demand" operation. Transfer case 20 can be further equipped with speed reduction means 50 for selectively transferring drive torque from engine 16 and transmission 18 to first output member 30 either directly (i.e., "high-range") or at a reduced-ratio (i.e., "low-range"). Preferably, actuator means 40 is operable for shifting speed reduction means 50 between its various speed ranges and actuating transfer clutch 38 in response to the mode signal generated by mode select means 44. Thus, the vehicle operator has the option of shifting power transfer system 10 between a two-wheel high-range drive mode, a part-time four-wheel high-range drive mode, a part-time four-wheel low-range drive mode, and the "on-demand" drive mode. As is schematically shown, controller means 46 is also operable for illuminating a visual display 52, located within the passenger compartment, for providing the vehicle operator with a visual indication of the operational status of power transfer system 10. As an additional feature, actuator means 40 may be provided with mode locking means for maintaining power transfer system 10 in the selected drive mode upon the interruption of power.

Figure 2:
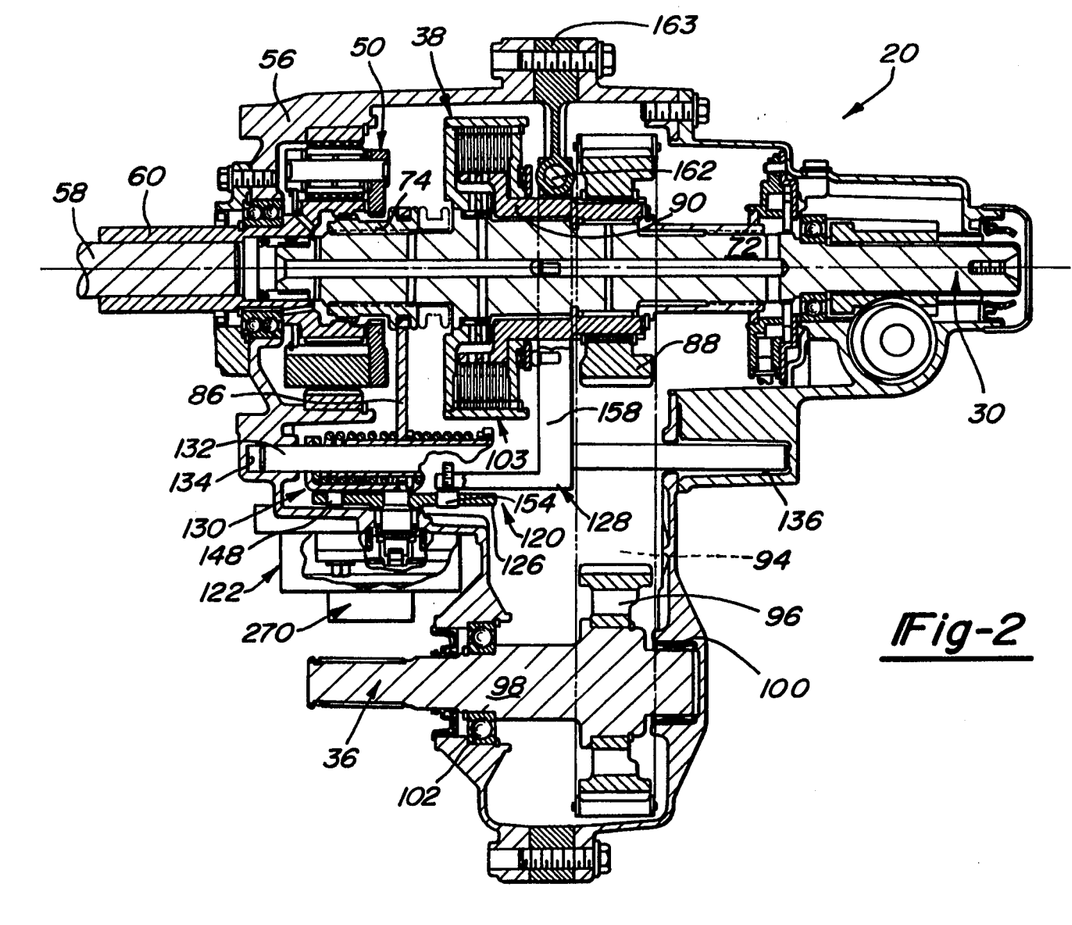
FIG. 2 is a cross-sectional view of a transfer case associated with the power transfer system and which includes a clutch assembly, a speed reduction mechanism, a drive mechanism, and an electronically-controlled actuator.
Figure 3:
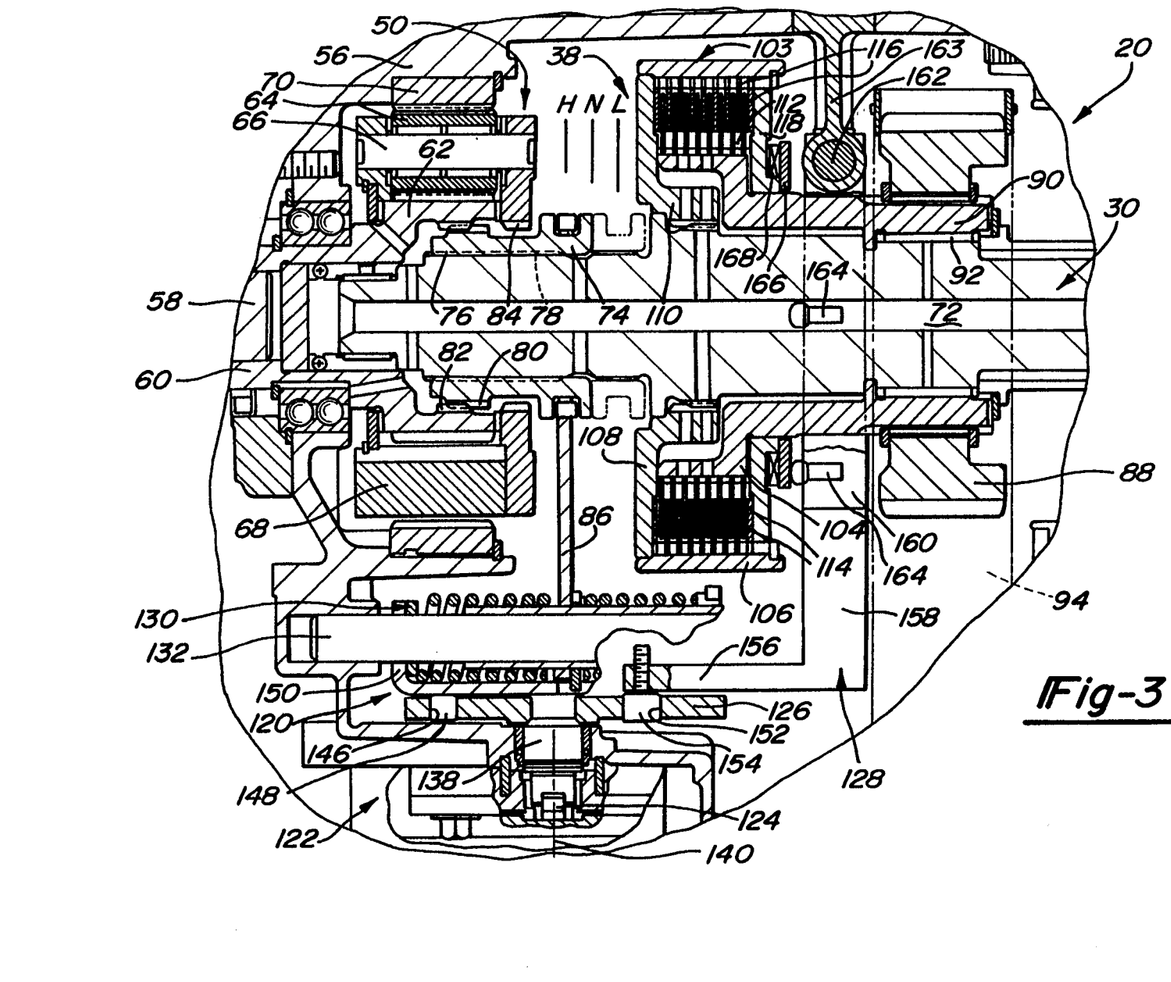
FIG. 3 is an enlarged partial view of FIG. 2 showing the various components in greater detail.

With particular reference to FIGS. 2 and 3, a preferred construction for transfer case 20 will now be described. Transfer case 20 is shown to include a housing 56 formed by a series of modular sections that are suitably interconnected in a conventional manner. A transmission output shaft 58 couples transmission 18 to an input shaft 60 of transfer case 20 for supplying power thereto. Input shaft 60 has an input sun gear 62 formed integral therewith and which is operably associated with speed reduction means 50. More specifically, sun gear 62 is meshed with a plurality of planet gears 64 (one shown), with each planet gear 64 being rotatably journalled on a pinion shaft 66 supported from a planetary carrier 68. Planet gears 64 also mesh with an annulus gear 70 which is non-rotatably mounted to an inner surface of housing 56. In operation, rotation of input shaft 60 results in planetary carrier 68 being rotatably driven at a reduced speed relative to sun gear 62. Thus, speed reduction means 50 is shown as a planetary gear assembly that is operable for establishing the high-range and low-range speed ratios. However, it will be appreciated that the planetary gear assembly is merely exemplary of one suitable speed reduction mechanism for use in transfer case 20.

According to the particular embodiment shown, first output member 30 is an elongated mainshaft 72 which is aligned on the longitudinal axis of input shaft 60 and is supported for rotation relative thereto. To provide means for selectively coupling mainshaft 72 to the output of speed reduction means 50, a range collar 74 is supported for rotation with, and axial sliding movement on, mainshaft 72 by means of collar internal splines 76 engaged with external splines 78 formed on mainshaft 72. In addition, range collar 74 is formed with external clutch teeth 80 that are shown engaged with sun gear internal clutch teeth 82. In the position shown, drive torque is transferred without reduction from input shaft 60 to mainshaft 72 via range collar 74, thereby establishing the direct-drive or "high-range" speed position, as indicated by the construction line "H". To provide means for driving mainshaft 72 at the reduced speed ratio, planetary carrier 68 includes internal clutch teeth 84 which are placed in meshed driving engagement with range collar external clutch teeth 80 upon range collar 74 being slid rearwardly for defining the "low-range" speed position, as indicated by the construction line "L". It will be noted that when range collar 74 is positioned between the high-range and low-range speed positions, its clutch teeth 80 are disengaged from both sun gear clutch teeth 82 and planetary carrier clutch teeth 84 for defining a "Neutral" position, as indicated by construction line "N". With range collar 74 in the Neutral position, no drive torque is transmitted from input shaft 60 to mainshaft 72 and, thus, no power is transmitted to the vehicle's rear wheels 14. Axial sliding movement of range collar 74 between the various speed positions is caused by axial movement of a range fork 86. As will be described, such movement of range fork 86 is controlled by actuator means 40 in response to the mode signal delivered to controller means 46 via mode select means 44.

With continued reference to FIGS. 2 and 3, means are shown for transferring drive torque from mainshaft 72 to front wheels 12 through transfer clutch 38. More specifically, a drive sprocket 88 is shown fixed for rotation on the aft end of an elongated clutch hub 90 that is associated with transfer clutch 38. Clutch hub 90 is shown rotatably supported by one or more suitable bearing assemblies 92 on mainshaft 72. Drive sprocket 88 drivingly engages a chain, shown in dashed lines at 94, which is coupled to a lower driven sprocket 96. Driven sprocket 96 is secured to, or an integral portion of, second output member 36 of part-time transfer case 20. Second output member 36 is shown as a front output shaft 98 which is supported for rotation within housing 56 by suitable bearing assemblies 100 and 102. As noted, front output shaft 98 is operably connected to the motor vehicle's front wheel 12 via front drive shaft 34.

Transfer clutch 38 is shown operably installed within transfer case 20 for transferring drive torque from mainshaft 72 to front output shaft 98. Preferably, transfer clutch 38 is a mechanically-actuated multi-plate clutch assembly that is arranged to concentrically surround a central portion of mainshaft 72 intermediate the planetary gear assembly and drive sprocket 88. As noted, elongated clutch hub 90 is fixedly secured to drive sprocket 88 so as to drive, or be driven by, front output shaft 98 of transfer case 20. In a preferred form, transfer clutch 38 includes a rotatable drum assembly 103 which concentrically surrounds a raised cylindrical section 104 formed at the forward end of clutch hub 90. Drum assembly 103 has an outer cylindrical drum 106 which is enclosed at one end by a cover plate 108. In addition, cover plate 108 has a cylindrical sleeve portion 110 that is fixed (i.e., splined) for rotation with mainshaft 72. Thus, drum assembly 103 and clutch hub 90 are capable of rotating relative to one another and form an internal chamber 112 therebetween. Disposed within internal chamber 112 are two sets of alternately interleaved friction clutch plates that are operable for transferring torque from mainshaft 72 and drum assembly 104 to clutch hub 90 and front output shaft 98 in response to a clutch "engagement" force applied thereto. One set of clutch plates, referred to as inner clutch plates 114, are mounted on raised section 106 for rotation with clutch hub 90 while the second set of clutch plates, referred to as outer clutch plates 116, are mounted for rotation with drum assembly 103. In addition, a reaction plate 118 is mounted on the aft end of cylindrical drum 106 for enclosing the interleaved clutch plates within chamber 112. Reaction plate 118 is rotatable with drum assembly 103 and yet is axially movable with respect to interleaved friction clutch plates 114 and 116. Thus, reaction plate 118 acts as a pressure plate for compressing the interleaved clutch plates so as to cause drive torque to be transferred through transfer clutch 38 as a function of the clutch engagement force exerted thereon by actuator means 40.

To provide means for selectively moving range collar 74 between its various speed range positions and for controlling the magnitude of the clutch engagement force exerted on reaction plate 118, actuator means 40 comprises a mechanical drive mechanism 120 and an electrically-controlled actuator 122. In general, actuator 122 is a rotary-driven actuator, such as an electric gearmotor, which is operable for generating an output torque, the value of which varies as a function of the magnitude of the electrical control signal applied thereto by controller means 46. More specifically, drive mechanism 120 is interconnected to a rotary output member 124 of actuator 122 for changing the output torque into an axially-directed force for controlling axial movement of range collar 74 and the engagement force applied to reaction plate 118 of transfer clutch 38. As best seen from FIGS. 3 and 4, drive mechanism 120 includes a sector plate 126 that is rotatably driven through a limited range of angular motion by output member 124 of actuator 122. Sector plate 126 is interconnected to a lever arm assembly 128 for exerting the clutch engagement force on reaction plate 118 in response to controlled rotation of sector plate 126. In addition, sector plate 126 is also interconnected to a shift fork assembly 130 for concurrently controlling the axial position of range fork 86 and, in turn, range collar 74 in response to such controlled rotation of sector plate 126. Shift fork assembly 130 is a spring-loaded mechanism supported for movement on a shift rail 132 and which is substantially similar to that described in commonly owned U.S. Pat. No. 4,529,080 to Dolan, the disclosure of which is expressly incorporated by reference herein. From FIG. 2, shift rail 132 is shown to have its opposite ends disposed in fore and aft sockets 134 and 136, respectively, formed in housing 56.

A rotatable actuating shaft 138 is supported from transfer case housing 56 for rotation about an axis 140. A first end of actuating shaft 138 is secured in an aperture 142 formed in sector plate 126, with its opposite end coupled to output member 124 of electrically-controlled actuator 122. Thus, actuating shaft 138 and sector plate 126 are rotated about axis 140 in response to the output torque generated by actuator 122. From FIG. 4 it can be seen that sector plate 126 may be rotated about axis 140 by actuator shaft 138 to any of five distinct sector positions, as labelled "4WH", "2WH", "N", "2 WL" and "4WL". To control movement of range collar 74, sector plate 126 has an elongated range slot 146 formed therein into which a range pin 148 extends. From FIG. 3, it can be seen that range pin 148 is fixed to a U-shaped bracket 150 of shift fork assembly 130 which is retained for sliding movement on shift rail 132. Range slot 146 is configured to cause the desired translational movement of bracket 150, range fork 86 and range collar 74 in response to controlled bi-directional rotation of sector plate 126.

Figure 4:
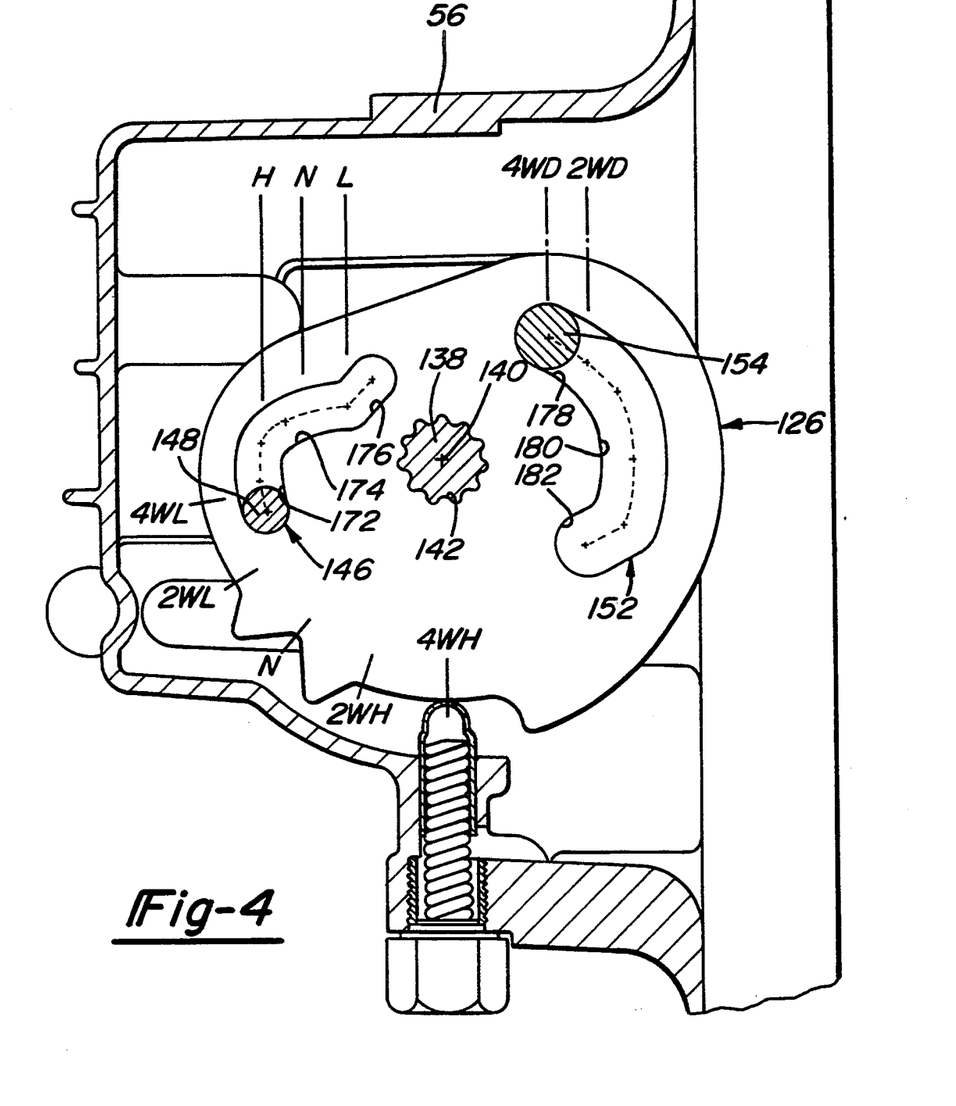
FIG. 4 is a side view of a sector plate that is rotatably driven by the actuator for actuating the clutch assembly and speed reduction mechanism.

To control the engagement force exerted on reaction plate 118, sector plate 126 further includes a elongated mode slot 152 into which a crowned roller 154 extends. Crowned roller 154 is fixed to a flange section 156 of a lever member 158 associated with lever arm assembly 128. Lever member 158 also includes a generally Y-shaped or forked section 160 which is bifurcated to surround mainshaft 72 and clutch hub 90. The bifurcated ends of forked section 160 are retained for pivotal movement on a transverse rail 162, the ends of which are retained in suitable sockets (not shown) formed in an intermediate spacer plate 163 fixed to housing 56. In general, the contour of mode slot 152 is configured to control the pivotable movement of lever member 158 in response to rotation of sector plate 126 for controlling the magnitude of the clutch engagement force exerted on reaction plate 118 of transfer clutch 38. Moreover, a plurality of circumferentially-spaced buttons 164 are secured to a front surface of forked section 160 and are adapted to apply the clutch engagement force to reaction plate 118 for compressing the interleaved clutch plates 114 and 116 via a suitable thrust mechanism. Preferably, the thrust mechanism includes an annular apply plate 166 positioned intermediate reaction plate 118 and lever member 158, and a thrust bearing/washer arrangement 168 interposed between apply plate 166 and reaction plate 118 for allowing rotation of reaction plate 118 with respect to apply plate 166.

In view of incorporation of speed reduction means 50 into transfer case 20, power transfer system 10 is operable for establishing five distinct operative modes, namely the two-wheel high-range drive mode, the part-time four-wheel high-range drive mode, the part-time four-wheel low-range drive mode, the "on-demand" drive mode and the Neutral mode. As described, the particular operational mode selected is established by the position of crowned roller 154 in mode slot 152 and the position of range pin 148 in range slot 146 in response to the angular position of sector plate 126. In operation, the vehicle operator selects the desired operative mode via mode select means 44 which, in turn, signals controller means 46 of the selection. Thereafter, controller means 46 generates an electrical control signal that is applied to actuator 122 for controlling the rotated position of sector plate 126. Moreover, for each of the 2WH, 4WH, N and 4WL operative drive modes, sector plate 126 is controllably rotated to the predefined sector position. However, when the "on-demand" drive mode is selected, power transfer system 10 is operable for modulating the clutch engagement force applied to transfer clutch 38 as a function of various system and operator initiated inputs.

With particular reference now to FIG. 4, means are provided for coordinating the axial movement of shift fork assembly 130 and the pivotal movement of lever arm assembly 128 upon rotation of sector plate 126 between the various sector positions for establishing the desired combination of drive modes and speed ranges. In general, the contour of range slot 146 is defined by first, second and third cam pathways 172, 174 and 176, respectively, which respectively correspond to fourth, fifth and sixth cam pathways 178, 180 and 182, respectively, associated with mode slot 152. In the sector position shown, crowned roller 154 is positioned within mode slot 152 in close proximity to the terminal end of fourth cam pathway 178 for establishing a four-wheel drive (4 WD) position. With crowned roller 154 in the four-wheel drive (4WD) position, lever arm assembly 128 exerts a maximum clutch engagement force on reaction plate 118 such that transfer clutch 38 is considered to be operating in a fully "actuated" or "locked-up" condition. As such, drive torque is transferred from mainshaft 72 and drum assembly 103 through the interleaved clutch plates to clutch hub 90 and, in turn, to front output shaft 98. In addition, range pin 148 is shown positioned within range slot 146 in close proximity to the terminal end of first cam pathways 172 for positioning range collar 74 in the high-range ("H") speed position. Accordingly, when mode select means 44 signals that the vehicle operator has selected the part-time four-wheel high-range drive mode, controller means 46 send a control signal to actuator 122 for generating sufficient output torque to rotate sector plate 126 to the 4 WH sector position shown.

As sector plate 126 is caused to rotate about axis 140 in a first (i.e., counterclockwise) direction from the position shown, the contour of fourth cam pathway 178 causes axial displacement of crowned roller 154 toward a two-wheel drive (2WD) position. Such movement of crowned roller 154 causes concurrent pivotable movement of lever arm assembly 128 which results in a proportional decrease in the clutch engagement force being exerted on reaction plate 118. Moreover, once crowned roller 154 is in the two-wheel drive (2WD) position, lever arm assembly 128 does not exert an engagement force on reaction plate 118 which is sufficient to transfer drive torque through transfer clutch 38, whereby transfer clutch 38 is considered to be in a "non-actuated" condition. Concurrent with such movement of crowned roller 154 in mode slot 152 toward the two-wheel drive (2WD) position, range pin 148 is guided within first cam pathway 172 of range slot 146 for maintaining range collar 74 in the high-range (H) speed position. As such, when mode select means 44 signals that the vehicle operator has selected the two-wheel high-range drive mode, controller means 46 sends a control signal to actuator 122 for causing sector plate to rotate to the 2WH sector position. As will be hereinafter detailed, when the "on-demand" mode is selected, actuator 122 is actuated in accordance with specific predefined relationships established in response to the current value of the sensor input signals for rotatably driving sector plate 126 to any position between the 2WH and 4WH sector positions. Thus, the amount of torque transferred to front output shaft 98 through transfer clutch 38 is proportional to the clutch engagement force, the value of which is determined by the particular position of crowned roller 154 between the two-wheel drive (2WD) position and the four-wheel drive (4WD) position that is established upon controlled rotation of Sector plate 126.

Power transfer system 10 is also operable to permit transfer case 20 to be shifted into a "Neutral" mode and the part-time four-wheel low-range drive mode. More particularly, upon mode select means 44 signalling selection of either mode, actuator 122 is actuated for causing sector plate 126 to rotate in the first direction for concurrently guiding crowned roller 154 within fifth cam pathway 180 of mode slot 152 and range pin 148 within second cam pathway 174 of range slot 146. The contour of fifth cam pathway 180 is designed to retain crowned roller 154 in the two-wheel drive (2WD) position, whereby transfer clutch 38 is maintained in the non-actuated condition. However, range pin 148 is axially displaced due to the contour of second cam pathway 174 for sequentially shifting range collar 74 from the high-range (H) speed position into the Neutral (N) speed position or the low-range (L) speed position. Thus, during "range" shifting of range collar 74, sector plate 126 is configured to maintain transfer clutch 38 in its non-actuated condition to eliminate the possibility of over-loading transfer clutch 38. Moreover, when the part-time four-wheel low-range drive mode is selected, sector plate 126 is rotated in the first direction through the N sector position and the 2WL sector position prior to entering into the 4WL sector position. Upon such movement, crowned roller 154 is guided in sixth cam pathway 182 of mode slot 152 for movement from the two-wheel drive (2WD) position into the four-wheel drive (4WD) position while range pin 148 is guided within third cam pathway 176 to maintain range collar 74 in the low-range (L) speed position, thereby establishing the part-time four-wheel low-range drive mode. Thus, while not typically required, transfer case 20 is also capable of providing a two-wheel low-range drive mode if desired.

In its most basic sense, the "on-demand" mode is provided for automatically and instantaneously transferring drive torque to front wheels 12 during the occurrence of slippage of rear wheels 14 that are typically associated with low tractive road conditions. Once the "on-demand" mode is selected, power transfer system 10 functions to continuously monitor and regulate the "on-demand" operation in a manner that is independent of any deliberate action by the vehicle operator. As noted, the actuated condition of transfer clutch 38 is modulated while speed reduction means 50 is operating in its high-range speed for controlling the output of transfer clutch 38 between the limits defined by the two-wheel high-range and part-time four-wheel high-range drive modes. Accordingly, the modulation range is established between the limits of bi-directional sector rotation defined by movement of crowned roller 154 within fourth cam pathway 178 between the 2WD and 4WD positions while range pin 148 is guided within first cam pathway 172. According to the embodiment disclosed, the magnitude of the engagement force generated by lever arm assembly 128 and applied to transfer clutch 38 is proportional to the magnitude of the output torque generated by actuator 122 which, in turn, is proportional to the magnitude of the electrical control signal (i.e., percentage duty cycle) applied to actuator 122. Thus, the amount of drive torque transferred through transfer clutch 38 to front output shaft 98 is also proportional to the magnitude of the control signal. As such, the distribution ratio of drive torque between front output shaft 98 and mainshaft 72 of transfer case 20 may be selectively varied as a function of changes in the magnitude of the control signal for optimizing the tractive performance characteristics associated with operation in the "on-demand" drive mode.

Figure 5:
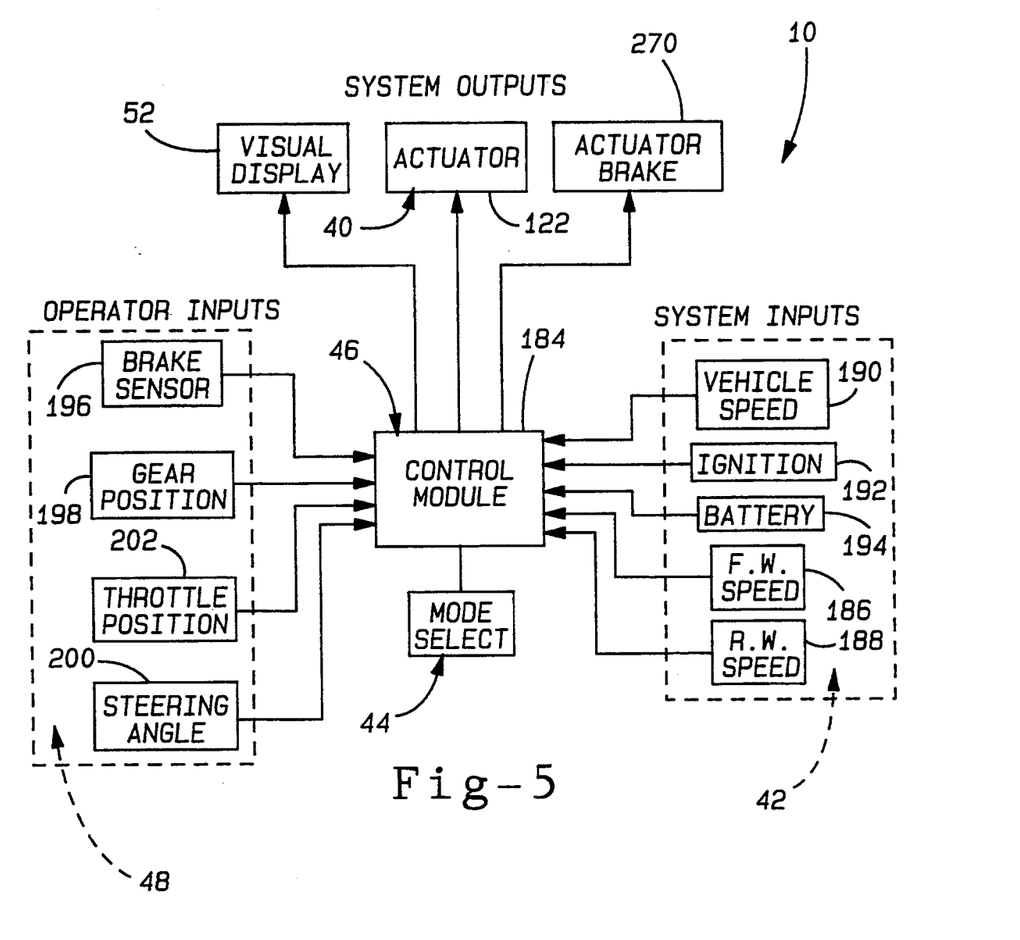
FIG. 5 is a block diagram of the control system for a preferred embodiment of the present invention.

With particular reference now to FIG. 5, a block diagram of a control system associated with power transfer system 10 is shown. Preferably, controller means 46 is an electronic control module 184 having signal processing and information storage capabilities. In addition, first sensor means 42 is shown as a group of various "system" sensors that are provided for detecting and signaling specific dynamic and operational characteristics of the motor vehicle. The input signals generated by the "systems" sensor group are delivered to electronic control module 184. Preferably, these sensors include a front speed sensor 186 for sensing the rotational speed ($n_F$) Of front drive shaft 34, a rear speed sensor 188 for sensing the rotational speed ($n_R$) of rear drive shaft 28, a vehicle speed sensor 190 for sensing a vehicle speed (V), an ignition switch 192 for signalling the operational status of the vehicle, and a battery input 194 for powering electronic control module 184. In vehicles equipped with an anti-lock brake system (ABS), the original equipment ABS sensors provided at each wheel can be used for determining an "average" front drive shaft speed and rear drive shaft speed. Alternatively, front and rear speed sensors 186 and 188, respectively, can be arranged for directly measuring the speed of front output shaft 98 and mainshaft 72, respectively. Moreover, it is possible for vehicle speed sensor 190 to be eliminated with the vehicle speed signal (V) being computed from the front rotational speed signal ($n_F$) generated by front speed sensor 186. However, it is to be understood that any suitable speed sensing arrangement capable of generating a signal indicative of the rotational speed of a shaft is fairly within the scope of the present invention.

The control system also utilizes various "operator-initiated" inputs, as generally categorized by second sensor means 48. These inputs include a brake sensor 196 for sensing when the vehicle operator is applying the brakes, a gear position sensor 198 for sensing a gear position of transmission 18, a steering angle sensor 200 for detecting the magnitude of a steering angle (Φ), and an accelerator sensor for sensing an accelerating condition of the vehicle. Preferably, the accelerator sensor is a throttle position sensor 202 for sensing the degree of opening of a throttle valve associated with engine 16 or for sensing the degree of depression of an accelerator pedal, and is operable to produce a throttle position signal (A). The operator-initiated input signals are delivered to control module 184 where they are used, in conjunction with the system input signals, to further control "on-demand" operation.

To provide means for the vehicle operator to shift power transfer system 10 into one of the available operational modes, mode select means 44 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality positions corresponding to the available operational modes which, in conjunction with a suitable electrical switch arrangement, generates a mode signal indicating the mode selected. In either form, mode select means 44 offers the vehicle operator the option of deliberately choosing between the various operative drive modes.

Figure 6:
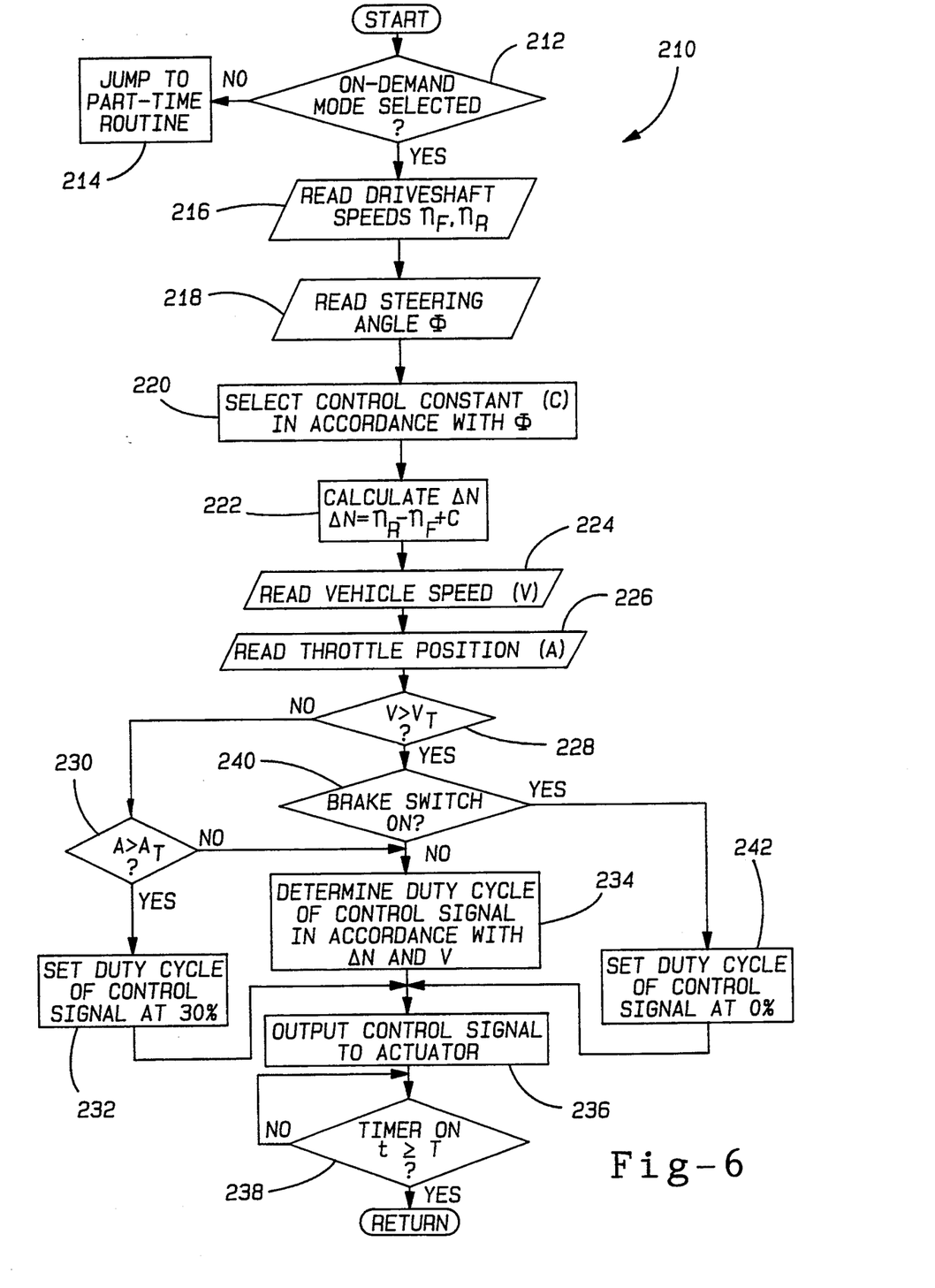
FIGS. 6 and 7 are flow charts depicting a control sequence for the operations performed by the control system of FIG. 5.
Figure 9:
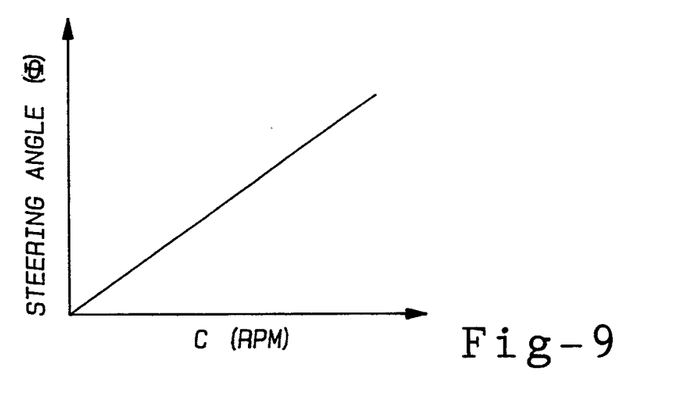
FIG. 9 is an exemplary plot of a relationship between steering angle and a control characteristic used for modifying the speed differential signal.

With reference now to FIG. 6, a control sequence for the selection and the subsequent automatic control of the "on-demand" drive mode is shown in a flow chart 210. In general, flow chart 210 represents a sequence of operations performed by electronic control module 184 which are diagrammatically shown in block form. When mode select means 44 signals selection of the "on-demand" mode, as indicated by block 21 2, a succession of control steps are repeated for selecting the value of the control signal to be applied to electric actuator 122. In the preferred form, the control signal is selected in accordance with various predefined relationships between the current value of a front and rear wheel speed differential (ΔN) and vehicle speed (V), as modified by current value of the steering angle (Φ) and other operator-initiated inputs. However, if any other mode is selected, then the control sequence jumps to a part-time routine, as indicated by block 21 4 and which is set forth in greater detail in FIG. 7. Block 216 is representative of the control step in which the current value of the rotational speed of front drive shaft 34 ($n_F$) and rear drive shaft 28 ($n_R$) are read. Block 218 indicates the step of reading the value of steering angle (Φ) as detected by steering angle sensor 200. Block 220 represents the operation of selecting a control characteristic (C) in accordance with the steering angle (Φ). FIG. 9 illustrates a plot of an exemplary relationship, which may be stored as a look-up table or computed from an arithmetic equation in control module 184, which correlates the control characteristic (C) as a linear function of the detected steering angle (ϕ). Next, block 222 represents the step of calculating the value of a speed differential (ΔN) according to the equation $$\Delta N = n_r - n_F + C$$

Blocks 224 and 226 indicate the steps of reading the current value of the vehicle speed (V) as detected by vehicle speed sensor 190 and the throttle position (A) as detected by throttle position sensor 202, respectively. As shown in block 228, control mode 184 determines whether the vehicle speed (V) exceeds a predefined threshold value ($V_T$) such as, for example, 5 mph. If the vehicle speed is less than the threshold value ($V_T$), a second determination is made (block 230) as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electrical control signal is set as a preset value, such as 30% duty cycle, as indicated by block 232. In this manner, power transfer system 10 is adapted to transfer torque to front wheels 12 in response to quick acceleration at low vehicle speeds to inhibit wheel slip. However, if the value of the throttle position (A) is less than its threshold value ($A_T$), then the magnitude of the duty cycle for the control signal is set in accordance with predefined relationships between the speed differential (ΔN) and vehicle speed (V), as indicated by block 234. Block 236 represents the step of outputting the electrical control signal to actuator 122 for developing the desired amount of torque transfer, if any, across transfer clutch 38. As shown in block 238, a timer circuit within control module 184 is actuated simultaneously with energization of actuator 122 for maintaining such energization for a predetermined time period (T). Once the period of energization (t) equals the predetermined time period (T) (or t ≧T), control module 184 repeats the control routine.

To enhance steering control, block 240 is indicative of the control step between steps 228 and 234 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 196) during an occurrence of a low traction road condition and the vehicle speed (V) is greater than the predefined threshold ($V_T$), then control module 184 sets the magnitude of the control signal sent to actuator 122 to zero (block 242) for de-actuating transfer clutch 38 and disabling the "on-demand" drive feature. This control sequence prevents simultaneous braking and "on-demand" four-wheel drive operation for providing the vehicle operator with greater steering and braking control. However, during the occurrence of a low traction condition when brake sensor 196 signals control module 184 that the vehicle operator is not applying the brakes, electronic control module 184 automatically energizes actuator 122 (block 236) for actuating transfer clutch 38 in accordance with the relationships generally denoted by block 234.

Figure 8:
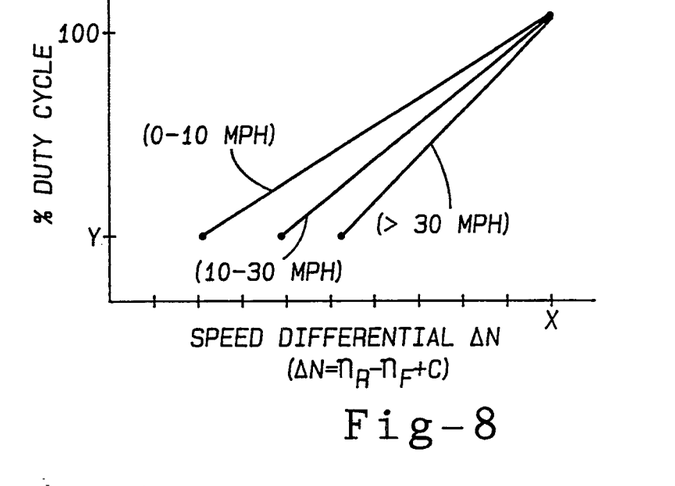
FIG. 8 illustrates exemplary plots of relationships between wheel speed differential signals at various vehicle speed ranges and the electrical control signal supplied by the control system to the actuator for controlling the amount of torque transferred through the clutch assembly during "on-demand" operation.

With particular reference to FIG. 8, a set of exemplary plots used for establishing the magnitude of the duty cycle in response to the current value of the speed differential (ΔN) and the vehicle speed (V) during "on-demand" operation, as diagrammatically referred to by block 234 in FIG. 6, will now be detailed. As seen, power transfer system 10 is programmed to linearly correlate the percentage duty cycle of the electrical control signal to a range of speed differential (ΔN) values. In general, the percentage duty cycle for the control signal increases linearly from a minimum actuation value (Y%) to a maximum actuation value (100%) as the value of the speed differential (ΔN), within a particular vehicle speed range, increases from a minimum speed differential limit to a maximum speed differential limit (X). As such, when the value of the speed differential (ΔN) is less than the minimum speed differential limit, no drive torque is transferred through transfer clutch 38 to front output shaft 98 and the vehicle operates in an otherwise normal two-wheel drive mode of operation. However, when the value of the speed differential (ΔN) exceeds the minimum differential limit, "on-demand" four-wheel drive operation is established by supplying a control signal to actuator 122 having a duty cycle value greater than (Y%). Thus, the minimum actuation duty cycle (Y%) for the control signal correlates to the point at which sufficient frictional engagement between interleaved clutch plates 114 and 116 results in the delivery of a portion of the total drive torque to front output shaft 98 of transfer case 20 for initiating four-wheel drive operation in the "on-demand" mode.

Figure 10:
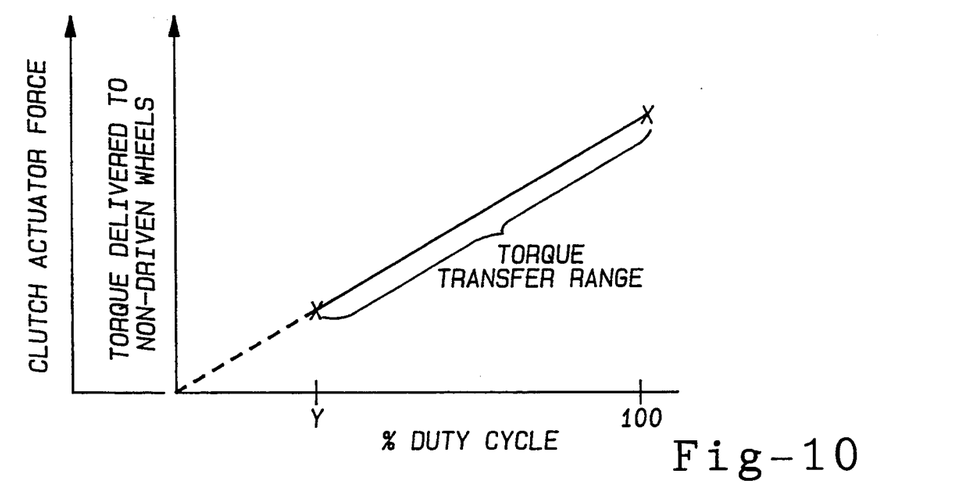
FIG. 10 graphically illustrates the relationship of the electrical control signal with respect to the output force generated by the drive mechanism and the corresponding drive torque transferred through the clutch assembly to the non-driven wheels.

Preferably, the portion of the total drive torque transferred through transfer clutch 38 to front output shaft 98 increases substantially linearly as the magnitude of the duty cycle for the control signal increases from the minimum actuation value (Y%) to the maximum actuation value (100%). Preferably, the maximum value (X) of the speed differential (ΔN) correlates to the maximum actuation duty cycle (100%) at which point the maximum clutch engagement force is generated for completely locking-up clutch plates 114 and 116. During "on-demand" operation, a reduction in the magnitude of the control signal sent to actuator 122 will result in actuator output member 124 being back-driven due to the clutch engagement load exerted by lever arm assembly 128 on sector plate 126. As such, a zero control signal will back-drive sector plate 126 to the two-wheel high-range (2WH) sector position. Alternatively, the direction of driven rotation of actuator output member 124 may be reversed for rotating sector 126 therewith until the desired clutch engagement force is established. As best seen from FIG. 10, an exemplary linear relationship between the magnitude of the duty cycle supplied to actuator 122 and the clutch engagement force generated and, in turn, the amount of torque delivered across transfer clutch 38 is shown.

Figure 7:
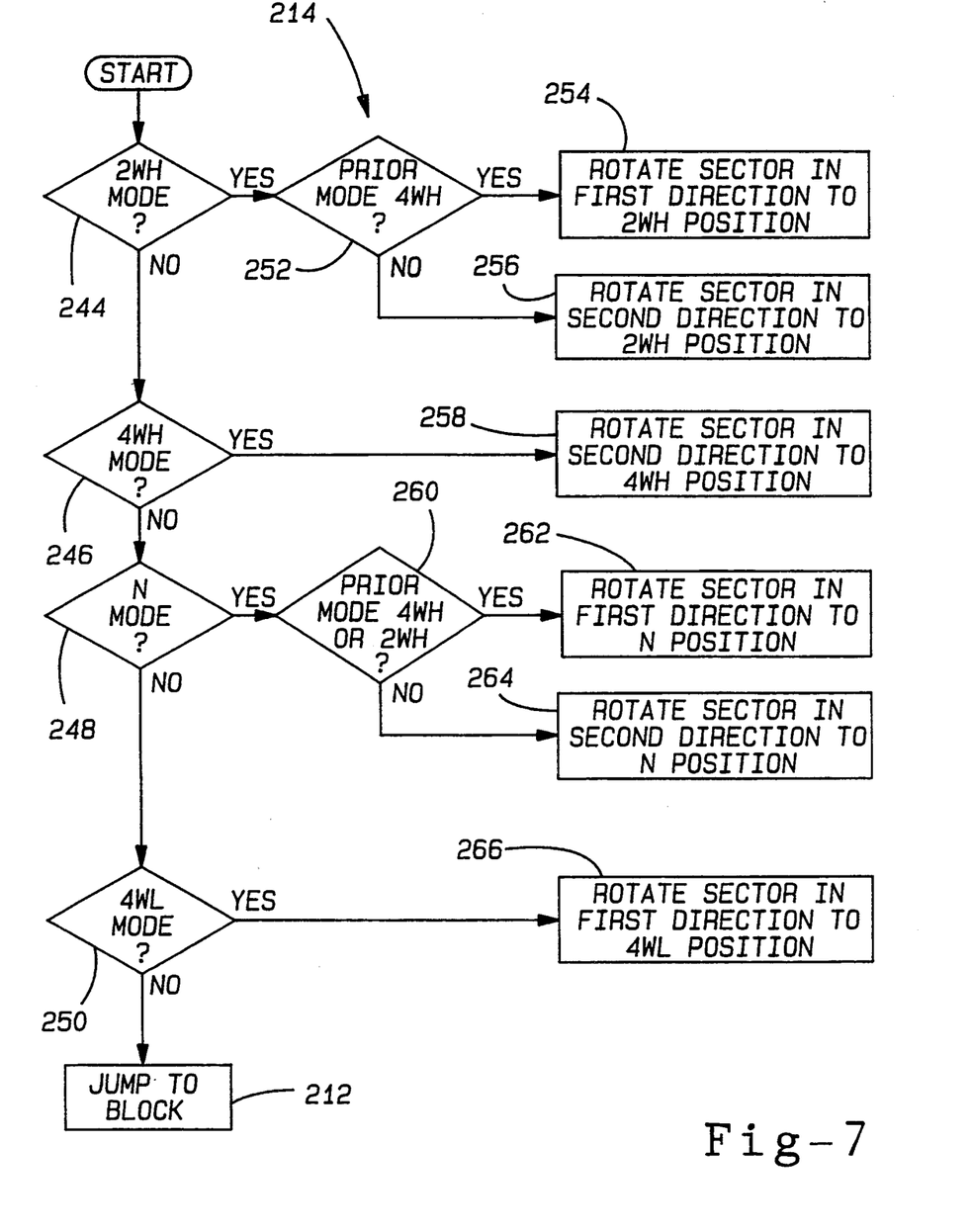

When the vehicle operator selects a operational mode via mode select means 44 other than the "on-demand" mode, control module 184 is adapted to supply a control signal to actuator 122 for causing sector plate 126 to rotate to the particular sector position corresponding to the selected drive mode. FIG. 7 illustrates a flow chart representing an exemplary sequence of operations preformed by control module 184, and herebefore referred to as part-time routine 21 4. In particular, blocks 244, 246, 248 and 250 represent the sequential steps of determining which of the two-wheel high-range drive mode (2WH), the part-time four-wheel high-range drive mode (4 WH), the Neutral mode or the part-time four-wheel low-range (4WL) drive mode, respectively, was selected, as signalled by mode select means 44. If the two-wheel high-range drive mode (2WH) was selected, block 252 indicates the step of determining whether the prior mode was the part-time four-wheel high-range drive mode (4WH). If yes, block 254 represents the step of control module 184 sending a control signal to actuator 122 for rotating sector plate 126 in the first direction to its 2WH sector position. If no, block 256 indicates the operation of rotating sector plate 126 in the second direction to its 2WH sector position.

If block 246 indicates that the part-time four-wheel high-range drive mode (4WH) was selected, then control module 184 sends the maximal value of the control signal to actuator 122 for causing sector plate 126 to rotate in the second direction to its 4WH sector position, as indicated by block 258. As noted, when the part-time four-wheel drive mode is selected, transfer clutch 38 is fully actuated into a maximum torque transfer "lock-up" condition. If block 248 indicates that the Neutral mode (N) was selected, step 260 determines if the prior mode was either of the two-wheel high-range drive mode (2WH) or pan-time four-wheel high-range drive mode (4WH). If yes, block 262 indicates the step of controllably actuating actuator 122 for rotating sector plate 126 in the first direction to its N sector position. If no, block 264 indicates the step of actuating actuator 122 to rotate sector plate 126 in the second direction to its N sector position. Finally, if the part-time four-wheel low-range drive mode (4WL) is selected (block 250), then actuator 122 is actuated for rotating sector plate 126 in the first direction to its 4WL sector position, as indicated by block 266. As is common to most part-time systems, it is contemplated that power transfer system 10 will inhibit completion of the shift into either of the Neutral mode or the part-time four-wheel low-range mode unless the vehicle speed (V) is less than the threshold value ($V_T$) and transmission 18 is in a Neutral gear position, as indicated by gear position sensor 198.

Finally, it is contemplated that the present invention can incorporate means for maintaining the selected mode upon power interruption to actuator 122. To this end, a brake 270, schematically shown in FIGS. 2 and 5, is provided. Brake 270 is an electrically-controlled spring-applied device that is operable in a "power-off condition for braking inertial loads (i.e., rotation) exerted on output member 124 of actuator 122 and, in turn, actuation shaft 138. During normal operation of the vehicle, control module 184 delivers an electrical signal to brake 270 to maintain it in a released or "power-on" condition. Moreover, during controlled rotation of sector 126, brake 270 is maintained in its released "power-on" condition. However, upon interruption of power to brake 270, brake torque is generated for inhibiting rotation of shaft 138. Thus, once sector plate 126 has been rotated into one of its part-time four-wheel drive sector positions, power to brake 270 can be interrupted for positively retaining sector plate 126 in the rotated position. Thereafter, power to actuator 122 can be interrupted to minimize its on-time service requirements.

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a motor vehicle having an engine and first and second sets of wheels, said power transfer system comprising:

a transfer mechanism having an input member rotatably driven by the engine, a first output member interconnecting said input member to the first set of wheels for transmitting drive torque from the engine to the first set of wheels for defining a two-wheel drive mode, a second output member interconnected to the second set of wheels, a speed reduction mechanism driven by said input member for establishing a reduced-ratio low-range drive, a shift member movable between a first position for directly coupling said first output member to said input member for establishing a high-range drive and a second position for coupling said first output member to said speed reduction mechanism for establishing said low-range drive, and a clutch assembly operable in an actuated state for selectively transmitting drive torque from said first output member to said second output member for establishing a four-wheel drive mode;

sensor means for detecting dynamic and operational characteristics of the vehicle and generating sensor input signals in response thereto;

mode select means for enabling a vehicle operator to intentionally select one of a two-wheel high-range drive mode, a four-wheel high-range drive mode, a four-wheel low-range drive mode and an on-demand four-wheel high-range drive mode, said mode select means further operable for generating a mode signal indicative of the particular drive mode selected;

coordinating means for coordinating movement of said shift member and said actuated state of said clutch assembly;

actuator means for selectively moving said coordinating means; and controller means for controlling actuation of said actuator means in response to said mode signal, said controller means operable for causing said actuator means to move said coordinating means to a 2WH position for de-actuating said clutch assembly and moving said shift member to said first position when said two-wheel high-range drive mode is selected, said controller means causing said actuator means to move said coordinating means to a 4WH position for actuating said clutch assembly and moving said shift member to said first position when said four-wheel high-range drive mode is selected, said controller means causing said actuator means to move said coordinating means to a 4WL position for actuating said clutch assembly and moving said shift member to said second position when said four-wheel low-range drive mode is selected, and said controller means causing said actuator means to modulate the position of said coordinating means between said 2WH and 4WH positions to vary the degree of actuation of said clutch assembly between said de-actuated and actuated conditions as a function of said sensor input signals for modulating the drive torque transmitted to the second set of wheels while maintaining said shift member in said first position when said on-demand mode is selected.

2. The power transfer system of claim 1 wherein said coordinating means comprises a drive mechanism for moving said shift member between said first and second positions, said drive mechanism further operable for exerting a clutch engagement force on a reaction member of said clutch assembly for actuating said clutch assembly in response thereto, and wherein said actuator means comprises an electrically-driven actuator interconnected to said drive mechanism for controlling movement of said drive mechanism in response to the magnitude of an electrical control signal supplied to said actuator from said controller means.

3. The power transfer system of claim 1 further comprising brake means that is automatically actuated for inhibiting movement of said actuator means in response to interruption of power thereto.

4. The power transfer system of claim 2 wherein said drive mechanism comprises a rotatable sector plate and a pivotable lever arm interconnected to said sector plate such that rotation of said sector plate in a first direction causes pivotable movement of said lever arm toward a first position whereat a minimum clutch engagement force is generated, and rotation of said sector plate in a second direction causes pivotable movement of said lever arm toward a second position whereat a maximum clutch engagement force is generated.

5. The power transfer system of claim 4 wherein said sector plate is operable for coordinating the movement of said shift member and the magnitude of said clutch engagement force exerted on said reaction member of said clutch assembly, said sector plate rotatable between said 2WH position, said 4WH position and said 4WL position.

6. The power transfer system of claim 3 wherein said sector plate is selectively movable between said positions in response to said mode signal, whereby when said mode signal indicates selection of said two-wheel high-range drive mode said control signal causes said actuator to move said sector plate to said 2WH position, when said four-wheel high-range drive mode is selected said control signal causes said actuator to move said sector plate to said 4WH position, and when said mode signal indicates selection of said on-demand mode said actuator modulates the position of said sector plate between said 2WH position and said 4WH position as a function of said sensor input signals.

7. The power transfer system of claim 6 wherein said mode select means is further operable for permitting said vehicle operator to select said four-wheel low-range drive mode wherein said control signal causes said actuator to move said sector plate to said 4WL position.

8. The power transfer system of claim 7 wherein said sensor means is operative for sensing the rotational speed of the first and second output members and respectively generating first and second speed signals indicative thereof, and further wherein said controller means is operative for receiving said first and second speed signals and generating a speed differential signal that is indicative of a speed differential between said first and second output members.

9. The power transfer system of claim 8 wherein said controller means causes selective rotation of said sector plate in said first direction for pivoting said lever arm to said first position when the value of said speed differential signal is less than a predetermined minimum value, and said controller means being further operable for rotating said sector plate in said second direction for pivoting said lever arm to said second position in response to a speed differential signal exceeding a predetermined maximum value.

10. The power transfer system of claim 9 wherein said controller means selectively rotates said sector plate for varying the magnitude of drive torque transmitted through said clutch assembly in response to changes in the value of said speed differential signal between said predetermined minimum value and predetermined maximum value.

11. A power transfer system for a four-wheel drive motor vehicle having an engine and first and second sets of wheels, comprising:
- a transfer mechanism for transmitting drive torque from the engine to the first set of wheels for establishing a two-wheel drive mode, said transfer mechanism having a transfer clutch capable of varying the torque transmitted therethrough by continuously varying a clutch engagement force for selectively transmitting drive torque to the second set of wheels;
- a drive mechanism for generating said clutch engagement force, said drive mechanism being movable between a first position whereat a minimum clutch engagement force is generated and a second position whereat a maximum clutch engagement force is generated;
- a first sensor for sensing the rotational speed of the first set of wheels and generating a first speed signal indicative thereof;
- a second sensor for sensing the rotational speed of the second set of wheels and generating a second speed signal indicative thereof;
- a speed reduction apparatus for establishing a direct-drive high speed range and a reduced-ratio low speed range, said speed reduction apparatus having a shift member movable between a high range position for establishing said high speed range and a low range position for establishing said low speed range;
- an actuator interconnected to said drive mechanism and said shift member and having an output member that is movable between different actuated positions for coordinating movement of said drive mechanism and said shift member;
- a mode select mechanism for enabling a vehicle operator to intentionally select one of a two-wheel high-range drive mode, a four-wheel high-range drive mode, a four-wheel low-range drive mode and an on-demand drive mode, said mode select mechanism further operable for generating a mode signal indicative of the particular drive mode selected; and
- a controller for receiving said first and second speed signals and generating a speed differential signal that is indicative of a speed differential between the first and second sets of wheels, said controller operable for controlling the actuated position of said actuator in response to said mode signal such that said controller is operable for moving said actuator to a first actuated position when said two-wheel high-range drive mode is selected, a second actuated position when said four-wheel high-range drive mode is selected, and a third actuated position when said four-wheel low-range drive mode is selected, said controller continuously varying the position of said actuator between said first and second actuated positions as a function of said speed differential signal for automatically varying the amount of drive torque delivered to the second set of wheels when said on-demand drive mode is selected.

12. The power transfer system of claim 11 further comprising a third sensor for generating a position signal that is indicative of the position of a movable control element under the control of a vehicle operator, said position signal being delivered to said controller for use in conjunction with said speed differential signal for modifying the actuated position of said actuator during operation in said on-demand drive mode.

13. The power transfer system of claim 11 wherein said controller generates a control signal that is proportional to said speed differential signal.

14. The power transfer system of claim 13 wherein said drive mechanism comprises a rotatable sector plate interconnected to a pivotable lever arm such that rotation of said sector plate in a first direction causes corresponding pivotable movement of said lever arm toward said first position and rotation of said sector plate in a second direction causes corresponding pivotable movement of said lever arm toward said second position, and wherein said actuator is an electrically-controlled actuator with said output member coupled to said sector plate for controlling rotation thereof in response to the magnitude of said electric control signal supplied to said actuator.

15. The power transfer system of claim 17 wherein said shift member is also interconnected to said sector plate such that said lever arm is in said first position and said shift member is in said high range position when said actuator output member is in said first actuated position, wherein said lever arm is in said second position and said shift member is in said high range position when said actuator output member is in said second actuated position, and wherein said lever arm is in said second position and said shift member is in said low range position when said actuator output member is in said third actuated position.

16. The power transfer system of claim 15 wherein said controller causes movement of said actuator output member to said first actuated position when the value of said speed differential signal is less than a predetermined minimum value and to said second actuated position in response to a speed differential signal having a predetermined maximum value during operation in said on-demand drive mode.

17. The power transfer system of claim 16 wherein said controller causes movement of said actuator output member from said first actuated position toward said second actuated position for increasing the magnitude of drive torque transmitted through said transfer clutch in response to increasing values of said speed differential signal between said predetermined minimum value and said predetermined maximum value.

18. The power transfer system of claim 11 wherein said transfer mechanism is a transfer case having a first output interconnected to the first set of wheels and a second output interconnected to the second set of wheels, and wherein said transfer clutch is a multi-disc friction clutch assembly that is operably installed between said first and second outputs of said transfer case.

19. The power transfer system of claim 18 wherein said first and second sensors are operable for respectively sensing the rotational speed of said first and second outputs of said transfer case, and wherein said mode select mechanism includes a manually-operable device for generating a mode signal that is indicative of the particular drive mode selected by said vehicle operator, said controller being operable to automatically vary the position of said actuator output member from said first actuated position toward said second actuated position when said speed differential exceeds a predetermined minimum value and said mode signal indicates that operation in said on-demand drive mode has been selected.

20. The power transfer system of claim 19 further comprising a brake sensor for providing a brake signal to said controller that indicates when said vehicle operator is applying the brakes, said controller being operable for automatically causing movement of said actuator output member to said first actuated position in response to application of the brakes during operation in said on-demand drive mode.

21. A power transfer system for a motor vehicle having an engine and first and second sets of wheels, the power transfer system comprising:
a transfer mechanism for transmitting drive torque from the engine to the first set of wheels and selectively transmitting drive torque to the second set of wheels through a transfer clutch capable of varying the torque transmitted therethrough by continuously varying a clutch engagement force;
a drive mechanism for generating said clutch engagement force, said drive mechanism being movable between a first position whereat a minimum clutch engagement force is generated and a second position whereat a maximum clutch engagement force is generated;
speed sensors for sensing the rotational speed of the first and second sets of wheels and respectively generating first and second speed signals indicative thereof;
a speed reduction apparatus for establishing a direct-drive high speed range and a reduced-ratio low speed range, said speed reduction apparatus having a shift member movable between a high-range position for establishing said high speed range and a low-range position for establishing said low speed range;
a movement coordination mechanism for coordinating movement of said drive mechanism and said shift member, said movement coordinating mechanism being movable between a 2WH position whereat said drive mechanism in said first position and said shift member in said high-range position, a 4WH position whereat said drive mechanism in said second position and said shift member in said high-range position, and a 4 WL position whereat said drive mechanism in said second position and said shift member in said low-range position;
an actuator for selectively moving said movement coordinating mechanism;
a mode select mechanism for enabling a vehicle operator to intentionally select one of a two-wheel high-range drive mode, a four-wheel high-range drive mode, a four-wheel low-range drive mode and an on-demand drive mode, said mode select mechanism further operable for generating a mode signal indicative of the particular drive mode selected; and
control means for receiving said first and second speed signals and generating a speed differential signal that is indicative of a speed differential between the first and second sets of wheels, said control means operable for controlling actuation of said actuator in response to said mode signal such that said actuator moves said movement coordinating mechanism to said 2 WH position when said two-wheel high-range drive mode is selected, said actuator moves said movement coordinating mechanism to said 4WH position when said four-wheel high-range drive mode is selected, and said actuator moves said movement coordinating mechanism to said 4 WL position when said four-wheel low-range drive mode is selected, said control means is further operable for causing said actuator to modulate the position of said movement coordinating mechanism between said 2WH and 4WH positions as a function of said speed differential signal for continuously varying the amount of drive torque delivered to the second set of wheels when said on-demand drive mode is selected.

22. The power transfer system of claim 21 wherein said control means causes movement of said movement coordinating mechanism to said 2 WH position when the value of said speed differential signal is less than a predetermined minimum value, and said control means causes movement of said movement coordinating mechanism to said 4 WH position in response to said speed differential signal exceeding a predetermined maximum value.

23. The power transfer system of claim 22 wherein said control means moves said movement coordinating mechanism from said 2 WH position toward said 4WH position in response to increasing values of said speed differential signal between said predetermined minimum value and predetermined maximum value for increasing the magnitude of drive torque transmitted through said transfer clutch.

* * * * *